(12) United States Patent
Colaianna et al.

(10) Patent No.: US 6,730,761 B2
(45) Date of Patent: May 4, 2004

(54) THERMOPROCESSABLE COPOLYMERS OF TFE

(75) Inventors: Pasqua Colaianna, Milan (IT); Giulio Brinati, Milan (IT); Giambattista Besana, Como (IT)

(73) Assignee: Ausimont S.p.A., Milan (IT)

( * ) Notice: Subject to any disclaimer, the term of this patent is extended or adjusted under 35 U.S.C. 154(b) by 12 days.

(21) Appl. No.: 10/322,631

(22) Filed: Dec. 19, 2002

(65) Prior Publication Data

US 2003/0158359 A1 Aug. 21, 2003

(30) Foreign Application Priority Data

Dec. 21, 2001 (IT) ...................... MI2001A2745

(51) Int. Cl.$^7$ ............................. C08F 116/12
(52) U.S. Cl. ....................... 526/247; 526/250
(58) Field of Search .................. 526/250, 247

(56) References Cited

U.S. PATENT DOCUMENTS

| | | | |
|---|---|---|---|
| 3,865,845 A | | 2/1975 | Resnick et al. |
| 4,743,658 A | * | 5/1988 | Imbalzano et al. ...... 525/326.4 |
| 4,864,006 A | | 9/1989 | Giannetti et al. |
| 5,093,409 A | * | 3/1992 | Buckmaster ................ 524/544 |
| 5,463,006 A | | 10/1995 | Abusleme et al. |

FOREIGN PATENT DOCUMENTS

| EP | 0 633 257 | * 1/1995 |
|---|---|---|
| EP | 1 167 401 A1 | 1/2002 |

OTHER PUBLICATIONS

Goodman et al., "Fluoride Contamination from Fluoropolymers in Semiconductor Manufacture", Solid State Technology, pp. 65–68, Jul. 1990.

Pianca et al., "End groups in fluoropolymers", Journal of Fluorine Chemistry, vol. 95, pp. 71–84, 1999.

\* cited by examiner

Primary Examiner—Bernard Lipman
(74) Attorney, Agent, or Firm—Arent Fox Kintner Plotkin & Kahn

(57) ABSTRACT

Thermoprocessable copolymers of TFE essentially formed by the following monomers:

(a) FMVE;

((b) a perfluorodioxole of formula:

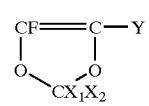

(I)

the complement to 100% by weight being TFE.

8 Claims, No Drawings

THERMOPROCESSABLE COPOLYMERS OF TFE

The present invention relates to thermoprocessable perfluorinated polymers for the preparation of manufactured articles used in the semicon industry, obtained for example by injection moulding and therefore characterized by the presence of welding lines.

In particular, the present invention relates to thermoprocessable copolymers of tetrafluoroethylene (TFE) showing very low values of extractable $F^-$ on pellets, not higher than 1 ppm, to which very good hot mechanical and elastomeric properties at temperatures up to 250° C. and elongation at break measured at 23° C. along the welding lines $\geq 130\%$ are associated. Therefore said thermoprocessable polymers are particularly suitable to be used in the semicon industry in the preparation of fittings and tanks, wherein welding points or lines are present, used for the storage and the transportation of chemical products and ultrapure water. Besides, the thermoprocessble copolymers of tetrafluoroethylene (TFE) of the invention show very low values of extractable chlorides ($Cl^-$), lower than 0.2 ppm by weight with respect to the polymer weight.

It is well known that in the semicon industry tanks and piping systems (pipes and fittings) formed by fluorinated polymer compounds, during the use can release $F^-$ ions. In order not to contaminate the transported fluids and avoid the damaging of the silicon-based wafers, it is required that the released $F^-$ ion amount be very low, not higher than 1 ppm. Indeed in the publication "Fluoride Contamination from Fluoropolymers in Semiconductor Manufacture" published on "State Solid Technology" pages 65–68, July 1990, it is stated that for the semicon industry it would be desirable to obtain finished manufactured articles which during the use release a $F^-$ amount lower than or equal to 1 ppm.

Said polymer compounds having a low $F^-$ release must have also good mechanical and flowing properties inside the mould, so as to guarantee a suitable mechanical resistance on the welding lines of the various fronts of the melted compound. An index of the suitable mechanical resistance on the welding lines is the elongation at break value on the welding lines which must be $\geq 130\%$.

The manufactured articles for the semicon industry are generally prepared with thermoprocessable copolymers of TFE and perfluoropropylvinylether (PPVE), belonging to the PFA class, wherein the PPVE is about 3.5–4.5% by weight. Said copolymers are preferably obtained by a polymerization process in aqueous emulsion which allows to obtain a high productivity and the formation of polymer structures having a high molecular weight, therefore characterized by good mechanical properties and good ductility. However the so obtained TFE/PPVE copolymers contain a certain amount of chain end groups of ionic type —$CF_2COOH$ and —COF. In the processing, for example for the preparation of pipes or fittings, said end groups —COF and —$CF_2COOH$ can decompose producing hydrofluoric acid. The formed hydrofluoric acid during the time is released by the manufactured article. Therefore the use of said manufactured articles in semicon manufacture plants can lead to corrosion phenomena of the silicon-based wafers. To minimize the HF formation during the processing so that the finished manufactured article shows the minimum amount of extractable F-, the prior art uses a fluorination process to transform the end groups into perfluorinated stable groups. See for example U.S. Pat. No. 4,743,658, wherein the TFE/PPVE copolymer is subjected to fluorination with elementary fluorine to reduce the amount of ionic end groups so that the fluorine extractable from the finished manufactured article be lower than 3 ppm by weight with respect to the polymer. Said process requires an additional step and from the industrial point of view it is not of easily feasible since it uses, as said, elementary fluorine which is a very aggressive agent. Therefore the fluorination step requires a special plant for its accomplishment on an industrial scale. Therefore said solution represents an additional cost for the manufacture plant of said polymers.

In the prior art other processes to reduce the number of ionic end groups in perfluorinated copolymers have been proposed. See for example U.S. Pat. No. 5,093,409 wherein the TFE/PPVE copolymer in the latex form is treated with amines at 160°–400° C. for a time sufficient to convert the ionic end groups —$CF_2COOH$ into —$CF_2H$ groups. Said post-treatment shows the same drawbacks mentioned above for fluorination.

A class of thermoprocessable copolymers of TFE having very high chemical inertia and thermal stability is described in U.S. Pat. No. 5,463,006, wherein terpolymers formed by TFE/PPVE/PMVE (perfluoromethylvinylether) are described. Said polymers are commercially available under the name HYFLON®. Tests carried out by the Applicant, see the comparative Examples, show that with said terpolymers, $F^-$ release values lower than 1 ppm are not obtained on the polymer (pellet). Also in this case it is necessary to carry out one of the above post-treatments to reduce the values of extractable $F^-$ to the required levels.

Therefore the thermoprocessable copolymers of TFE of the prior art usable in the semicon industry show the following combination of properties: good mechanical properties at high and low temperature, release values of $F^-$ lower than 1 ppm. However the drawback of said copolymers is that the combination of said properties is obtained with the proviso to subject them to a specific fluorination or conversion treatment of the end groups, as previously described.

Patent publication EP 1,167,401 describes fluorinated polymers usable for applications in the semicon industry, in particular suitable to produce systems of pipes with low $F^-$ release. The process to obtain said fluorinated polymers with low $F^-$ release is such not to require any of the above additional steps. However the injection moulding of the manufactured articles with the respective mechanical properties measured along the welding lines is not mentioned. In fact application examples on fittings are not reported. Tests carried out by the Applicant have shown that by operating with the composition indicated in said patent application it is not possible to obtain an optimal combination of good mechanical properties at high temperature with good mechanical properties at room temperature along the welding lines, in particular elongations at break$\geq 130\%$.

As known, the plant for the semicon manufacture, besides by the piping systems obtainable by extrusion, is formed also by valves, fittings and connectors, which are generally produced by injection moulding. The manufactured articles obtained by said process show one or more welding lines; said lines are the sites in the mould where different fronts of the same melted compound come into contact. They solidify in contact with the cooled mould wall. Said lines are weak points of the manufactured article if the different fronts of the melted material do not weld well each other, giving rise to low values of elongation at break, lower than 130%, measured along the welding lines, to which unsatisfactory mechanical properties are associated.

The need was felt to have available in the semicon industry a thermoprocessable fluoropolymer capable to allow the preparation of manufactured articles, in particular fittings, having the following combination of properties:
- good mechanical properties measured at room temperature (23° C.) on the welding lines of injection moulded articles; in particular an elongation at break≧130%;
- F⁻ release values, on the polymer pellet not higher than 1 ppm by weight with respect to the polymer weight;
- extractable Cl⁻ values lower than 0.2 ppm by weight with respect to the polymer weight;
- amount of ionic end groups not higher than $5.10^{-4}$ moles/Kg polymer;
- good hot mechanical properties up to temperatures of 250° C., in particular for a polymer which is processable by injection moulding, the stress at break must be higher than or equal to 2.5 MPa and the elongation at break higher than or equal to 250%.

The Applicant has surprisingly and unexpectedly found that it is possible to obtain the combination of the above properties by using a specific monomeric composition of thermoprocessable copolymers of TFE as defined below.

An object of the present invention are therefore thermoprocessable copolymers of TFE consisting essentially of the following monomers in the indicated amounts:

A)
  (a) 8.6–9.8% by weight of perfluoromethylvinylether (FMVE);
  (b) 0.3–1.2% by weight of a perfluorodioxole of formula:

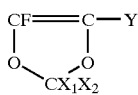

(I)

wherein: Y=F, OR$_f$, R$_f$ wherein R$_f$ is a perfluoroalkyl having from 1 to 5 carbon atoms;
X$_1$ and X$_2$, equal to or different from each other, are —F or —CF$_3$;
with the proviso that the sum of the percentages by weight of (a)+(b) is from 8.9 to 11% by weight; or B)
  (a) 4.5–8.5% by weight of perfluoromethylvinylether (FMVE);
  (b) 1.7–7.5% by weight of a perfluorodioxole as defined in A);
with the proviso that the sum of the percentages by weight of (a)+(b) is from 6.2 to 11% by weight;
the complement to 100% by weight in compositions A) and B) being TFE;
said copolymers having:
  an amount of ionic end groups of —COOH and —COF type, not higher than $5\times10^{-4}$ moles/Kg of polymer;
  release values of F⁻ ions, determined on the polymer in pellet, not higher than 1 ppm by weight with respect to the polymer weight;
wherein the manufactured articles obtained from the polymers having compositions A) or B) show the following mechanical properties:
  elongation at break≧130% measured at 23° C. along the welding lines of the injection moulded articles;
  stress at break≧2.5 MPa and elongation at break≧250%, measured at 250° C. on compression moulded plaque.

Among comonomers (b) the dioxole can for example be mentioned, having in formula (I) Y=F, X$_1$=X$_2$=CF$_3$, known as perfluoro-2,2-dimethyl-1,3-dioxole (PDD). See for example U.S. Pat. No. 3,865,845.

Preferably in the present invention as monomer (b) the compound 2,2,4-trifluoro-5-trifluoromethoxy-1,3-dioxole (TTD), obtainable in formula (I) when Y=OR$_f$, R$_f$ being =—CF$_3$; X$_1$=X$_2$=F, is used.

The copolymers of the invention, as said, do not require any fluorination or transformation treatment of the end groups above described, to obtain extractable F⁻ values on pellet not higher than 1 ppm.

The copolymers of the present invention can have Melt Flow Index from 1 to 40 g/10' measured at 372° C. with a load of 5 Kg; when the copolymers are used to obtain by moulding fittings, valves, connectors for pipes, etc. they have MFI preferably from 6 to 30 g/10'.

The copolymers of the invention can be obtained by polymerizing the monomers by radical route both in aqueous and in organic medium. The polymerization in aqueous medium can be carried out in emulsion or in microemulsion in the presence of a radical inorganic initiator, such for example the ammonium and/or potassium and/or sodium persulphate, optionally in combination with ferrous, cupreous or silver salts. The initiator feeding can be made in a continuous way or by a single addition at the polymerization starting, or by subsequent additions during the reaction.

The last two modalities are preferable since they reduce the polymerization times, at equal content of the ionic end groups in the polymer. It has been found by the Applicant that the used initiator amount must be low. The initiator amount in fact depends on the conditions used in polymerization. For example by operating at a temperature of 75° C. with a pressure of 21 absolute bar ($21.10^5$ Pa), when the fed initiator amount, for example potassium persulphate, is ≦0.03 grams/liter water, allows to obtain the above number of ionic end groups.

In the polymerization process it is preferable that the perfluorodioxole monomer (b) be fed in a continuous way for the whole reaction.

The polymerization temperature can range from 25° C. to 120° C. A temperature range from 50° C. to 95° C. is preferred when the polymerization is carried out in emulsion or in aqueous microemulsion in the presence of persulphates. The polymerization can take place at pressures comprised between 10 bar ($10^6$ Pa) and 50 bar ($5.10^6$ Pa).

The polymerization in aqueous medium requires the presence of a surfactant. Fluorinated surfactants, such as perfluorooctanoate, or perfluorooctanoate, perfluorononanoate, perfluorodecanoate mixtures in the corresponding ammonium, potassium or sodium salts are particularly preferred. It results particularly suitable to carry out the polymerization in aqueous phase in the presence of perfluoropolyethers as surfactants. Said perfluoropolyethers can be added to the reaction medium under microemulsion form, as described in U.S. Pat. No. 4,864,006.

For the molecular weight control of the invention terpolymers chain transfer agents are used, such as hydrogen, methane, ethane, propane, which give end groups of hydrogenated type, suitable therefore to the invention applications in the semicon industry. Chlorinated transfer agents are not used since they produce an unacceptable amounts of extractable Cl⁻.

The polymerization latex is coagulated with a coagulating agent such as for example nitric acid; then the slurry washing and the subsequent drying of the wet polymer are carried out. The powder is then pelletized in a twin screw extruder equipped with two degassing zones.

Taking into account the above information, the skilled man in the field is capable to obtain the fluorinated invention copolymers having MFI in the desired range.

As said, the thermoprocessable copolymers of the present invention can be used to produce fittings, valves, connectors for fittings.

The manufactured articles formed by the invention polymers and obtained by injection moulding have optimal hot and cold mechanical properties, and unexpectedly good mechanical properties on the welding lines.

The manufactured articles obtainable with the thermoprocessable copolymers of TFE of the present invention have the following mechanical properties: elongation at break measured at 23° C. on the welding lines $\geq$130%, preferably from 150% to 300%; stress at break at 250° C.$\geq$2.5 MPa, preferably from 2.5 to 6 MPa; elongation at break at 250° C.$\geq$250%, preferably from 270 to 500%.

To obtain the property combination which makes said manufactured articles suitable to be used in the semicon industry, it has been found by the Applicant that it is necessary to use in polymerization compositions A) or B) wherein the comonomer (a) and (b) amounts are as above defined.

Besides, tests carried out by the Applicant (see the comparative Examples) show that when the sum of the concentrations of perfluorodioxole and perfluoromethylvinylether is over the above limit of 11% by weight, there is a worsening of the mechanical properties at 250° C. In particular the stress at break is lower than 2.5 MPa and the elongation at break is lower than 250%.

When the perfluoromethylvinylether and/or perfluorodioxole percentages are lower than the indicated values in compositions A) and B), the polymer shows low elongation at break values along the welding lines of the injection moulded articles, and therefore it is not suitable for applications in the semicon industry.

The thermoprocessable fluoropolymers of the present invention are usable to obtain manufactured articles produced by injection moulding.

The present invention will be better illustrated by the following Examples, which have a merely indicative but not limitative purpose of the scope of the invention.

EXAMPLES

Characterization

The following determinations are carried out on the copolymer granules of the invention:

MFI, determined with a load of 5 Kg at the temperature of 372° C. according to the ASTM D 1238-52T method.

Determination of the second melting temperature by DSC.

A Perkin-Elmer mod. IV calorimeter has been used. About 10 mg of the specimen were heated starting from the room temperature up to 350° C. by using a gradient of 10° C./min. The specimen was maintained at 350° C. for 5 minutes, then cooled at room temperature using the same temperature gradient of the previous step. The specimen was lastly heated again from room temperature to 350° C. with the same above modalities. During the last step the temperature corresponding to the maximum of the melting endothermy curve has been determined, which corresponds to the second melting temperature (melting T(II)).

Tensile properties (stress and elongation at break, yield stress and Young modulus according to ASTM D 1708 method, both at room temperature (23° C.) and at 250° C.).

Chain end group determination by IR analysis carried out on a specimen obtained from pellet by cold compression, as described in the publication "End-groups in Fluoropolymer" published on Journal of Fluorine Chemistry 95 (1999), pages 71–84.

F$^-$ anions release determination on pellets at 85° C. by ionic chromatography. The specimen preparation is carried out by using KaPak®/Scotchpack vessels filled with deionized water at 18 m$\Omega$ and an amount equal to 5 grams of pellets. The vessels containing the polymer specimen are closed and kept in a bath at 85° C. for 24 hours. Then the water contained in the vessels is analyzed by ionic chromatography, according to the following conditions:

column and precolumn AS4A+AG4A-Dionex;
eluent: $Na_2B_4O_7$ 3.0 mM, flow 1 cc/min;
detection: suppressed conductivity;

To obtain specimens for the determination of the mechanical properties (determined at the temperature of 23° C.) on the welding line the pellets have been injection moulded using a Negri-Bossi NB25 press with a rectangular double injection mould on two opposite sides. The obtained article (moulded plaque) weighs about 46 g. The operating conditions are:

Temperature profile set up on the machine:
  barrel temperature zone 1: 325° C.;
  barrel temperature zone 2 and zone 3: 340° C.;
  die temperature: 360° C.
Melted temperature: 365° C.
Mould temperature: 210° C.

Injection and maintenance pressures comprised between 17 bar ($1.7.10^6$ Pa) and 22 bar ($1.8.10^6$ Pa) are used in the Examples. The injection time is of about 35 seconds.

Example 1

Obtaining of a Fluoropolymer According to the Invention having the Following Nominal Composition: FMVE 5.6% by Weight, TTD 1.8% by Weight; FMVE+TTD=7.4% by Weight In a 22 liter AISI 316 steel vertical autoclave, equipped with stirrer working at 400 rpm, after vacuum having been made, 13.9 liters of demineralized water, 10 g of 2,2,4 trifluoromethoxy 1,3 dioxole (TTD) and 160 g of an aqueous microemulsion of perfluoropolyether prepared according to the procedures described in Example 1 of U.S. Pat. No. 4,864,006 are fed in sequence.

The autoclave is heated up to the reaction temperature of 75° C. and then:

0.51 absolute bar ($5.1.10^4$ Pa) of ethane;
2.86 absolute bar ($2.86.10^5$ Pa) of perfluoromethylvinylether (FMVE) are fed.

A gaseous mixture having the following molar ratios: TFE/FMVE 27.31, FMVE/TTD 3.9 and TFE/TTD 106.22 fed by a compressor up to a pressure inside the autoclave of 21 absolute bar ($2.1.10^6$ Pa).

The composition of the gaseous mixture present in the autoclave head space is analyzed by gas-chromatography. Before the reaction starts, the gas phase results to be constituted by the following component molar percentages: TFE 81.2%, FMVE 16.4%, TTD 0.7%, ethane 1.5%.

By a metering pump 150 ml of a potassium persulphate 0.0103 M solution are fed.

The polymerization pressure is maintained constant by feeding the monomeric mixture having the above ratios. When 8,800 g of the aforesaid mixture have been fed, the reaction is stopped, the reactor is cooled to room temperature, the emulsion is discharged and coagulated with $HNO_3$ at 65%. Subsequently the polymer is washed and dried at 220° C.

The polymer nominal composition in percentage by weight, i.e. the composition determined on the basis of the fed monomer amounts, is the following: FMVE 5.6%, TTD 1.8%, TFE 92.6%.

The composition, the chemico-physical properties of the polymer (MFI and melting T(II)), the number of ionic end groups (measured by IR) and the extractable F value on the pellet are reported in Table 1.

The cold (23° C.) and hot (250° C.) mechanical properties are reported in Table 2.

The mechanialaa properties measured along the welding lines of the plaques obtained by injection moulding are reported in Table 4.

Example 2 (Comparative)

Obtaining of a Fluoropolymer having the Following Nominal Composition: FMVE 6.3% by Weight, TTD 0.7% by Weight; FMVE+TTD=7.0% by Weight In the same autoclave used in Example 1, after vacuum having been made, 13.9 liters of demineralized water, 4.2 g of TTD and 160 g of the above microemulsion are fed in sequence.

The autoclave is heated up to the reaction temperature of 75° C. and then 0.485 bar ($4.85 \cdot 10^4$ Pa) of ethane, 3 bar ($3.10^5$ Pa) of FMVE are fed.

By a compressor a gaseous mixture having the following molar ratios among the components is fed: TFE/FMVE= 24.55, FMVE/TTD=10.83, TFE/TTD 265.94 up to a pressure of 21 absolute bar ($2.1 \cdot 10^6$ Pa).

The composition of the gaseous mixture present in the autoclave head space is analyzed by gas-chromatography. Before the reaction starts, the gas phase results to be constituted by the following component molar percentages: TFE 79%, TTD 0.4%, FMVE 18.93% and ethane 1.6%.

The process described in Example 1 is followed until polymer drying.

The polymer nominal composition in percentage by weight is the following: FMVE 6.3%, TTD 0.7%, TFE 93.0%. Said composition contains a FMVE amount lower than the limit in the case of composition A).

The data relating to the comparative Examples are reported in Table 1bis, corresponding to Table 1 of the Examples of the invention. Tables 3 and 5 correspond to Tables 2 and 4 of the Examples of the invention.

Example 3

Obtaining of a Fluoropolymer According to the Invention having Following Nominal Composition: FMVE 5.6% by Weight, TTD 2% by Weight; FMVE+TTD=7.6% by Weight In the same autoclave used in Example 1, after vacuum having been made, 13.9 liters of demineralized water, 12 g of TTD and 160 g of the above microemulsion are fed in sequence.

The autoclave is heated up to the reaction temperature of 75° C. and then 0.51 bar ($5.1 \cdot 10^4$ Pa) of ethane and 2.86 bar ($2.86 \cdot 10^5$ Pa) of FMVE are fed.

By a compressor a gaseous mixture having the following molar ratios among the components is fed: TFE/FMVE= 27.28, FMVE/TTD=3.5, TFE/TTD=95.5 up to a pressure of 21 absolute bar ($2.1 \cdot 10^6$ Pa).

The composition of the gaseous mixture present in the autoclave head space is analyzed by gas-chromatography. Before the reaction starts, the gas phase results to be constituted by the following component molar percentages: TFE 81%, TTD 0.8%, FMVE 16.5%, ethane 1.7%.

The process described in Example 1 is followed until polymer drying.

The polymer nominal composition in percentage by weight is the following: FMVE 5.6%, TTD 2.0%, TFE 92.4%.

In Tables 1, 2 and 4 the data as indicated in Example 1 are reported.

Example 4

Obtaining of a Fluoropolymer According to the Invention having the Following Nominal Composition: FMVE 5.6% by Weight, TTD 3% by Weight; FMVE+TTD=8.6% by Weight In the same autoclave used in Example 1, after vacuum having been made, 13.9 liters of demineralized water, 18 g of TTD and 160 g of the above microemulsion are fed in sequence.

The autoclave is heated up to the reaction temperature of 75° C. and then 0.49 bar ($4.9 \cdot 10^4$ Pa) of ethane and 2.86 bar ($2.86 \cdot 10^5$ Pa) of FMVE are fed.

By a compressor a gaseous mixture having the following molar ratios among the components is fed: TFE/FMVE= 27.14, FMVE/TTD=2.33, TFE/TTD=63.33 up to a pressure of 21 absolute bar ($2.1 \cdot 10^6$ Pa).

The composition of the gaseous mixture present in the autoclave head space is analyzed by gas-chromatography. Before the reaction starts, the gas phase results to be constituted by the following component molar percentages: TFE 80.7%, TTD 1.4%, FMVE 16.3%, ethane 1.6%.

The process described in Example 1 is followed until polymer drying.

The polymer nominal composition in percentage by weight is the following: FMVE 5.6%, TTD 3.0%, TFE 91.4%.

The data as indicated in Example 1 are reported in Tables 1, 2 and 4.

Example 5

Obtaining of a Fluoropolymer According to the Invention having the Following Nominal Composition: FMVE 5.6% by Weight, TTD 4% by Weight; FMVE+TTD=9.6% by Weight In the same autoclave used in Example 1, after vacuum having been made, 13.9 liters of demineralized water, 23.4 g of TTD and 160 g of the above microemulsion (Example 1) are fed in sequence.

The autoclave is heated up to the reaction temperature of 75° C. and then 0.49 absolute bar ($4.9 \cdot 10^4$ Pa) of ethane and 2.86 absolute bar ($2.86 \cdot 10^5$ Pa) of FMVE are fed.

By a compressor a gaseous mixture having the following molar ratios among the components is fed: TFE/FMVE= 27.0, FMVE/TTD=1.75, TFE/TTD=47.25 up to a pressure of 21 absolute bar ($2.1 \cdot 10^6$ Pa).

The composition of the gaseous mixture present in the autoclave head space is analyzed by gas-chromatography. Before the reaction starts, the gas phase results to be constituted by the following component molar percentages: TFE 79.5%, TTD 1.9%, FMVE 17% and ethane 1.6%.

The process described in Example 1 is followed until drying of the polymer.

The polymer nominal composition in percentage by weight is the following: FMVE 5.6%, TTD 4.0%, TFE 90.4%.

The data as indicated in Example 1 are reported in Tables 1, 2 and 4.

Example 6

Obtaining of a Fluoropolymer According to the Invention having the Following Nominal Composition: FMVE 6.4% by Weight, TTD 1.7% by Weight; FMVE+TTD=8.1% by Weight In the same autoclave used in Example 1, after vacuum having been made, 13.9 liters of demineralized water, 9.5 g of TTD and 160 g of the above microemulsion (Example 1) are fed in sequence.

The autoclave is heated up to the reaction temperature of 75° C. and then 0.51 absolute bar ($5.1.10^4$ Pa) of ethane and 3.1 absolute bar ($3.1.10^5$ Pa) of FMVE are fed.

By a compressor a gaseous mixture having the following molar ratios among the components is fed: TFE/FMVE= 23.8, FMVE/TTD=4.76, TFE/TTD=113.28 up to a pressure of 21 absolute bar ($2.1.10^6$ Pa).

The composition of the gaseous mixture present in the autoclave head space is analyzed by gas-chromatography. Before the reaction starts, the gas phase results to be constituted by the following component molar percentages: TFE 78.4%, TTD 0.81%, FMVE 18.8% and ethane 1.99%.

By a metering pump 95 ml of a solution of potassium persulphate 0.0103 M are fed and after 250 minutes further 45 ml of the same solution are introduced.

The process described in Example 1 is followed until drying of the polymer.

The polymer nominal composition in percentage by weight is the following: FMVE 6.4%, TTD 1.7%, TFE 91.9%.

The data as indicated in Example 1 are reported in Tables 1, 2 and 4.

Example 7

Obtaining of a Fluoropolymer According to the Invention having the Following Nominal Composition: FMVE 8.8% by Weight, TTD 0.7% by Weight; FMVE+TTD=9.5% by Weight In the same autoclave used in Example 1, after vacuum having been made, 13.9 liters of demineralized water, 4.2 g of TTD and 160 g of the above microemulsion (Example 1) are fed in sequence.

The autoclave is heated up to the reaction temperature of 75° C. and then 0.46 absolute bar ($4.6.10^4$ Pa) of ethane and 4.14 absolute bar ($4.14.10^5$ Pa) of FMVE are fed.

By a compressor a gaseous mixture having the following molar ratios among the components is fed: TFE/FMVE= 17.12, FMVE/TTD=15.71, TFE/TTD=269, up to a pressure of 21 absolute bar ($2.1.10^6$ Pa).

The composition of the gaseous mixture present in the autoclave head space is analyzed by gas-chromatography. Before the reaction starts, the gas phase results to be constituted by the following component molar percentages: TFE 72.6%, TTD 0.4%, FMVE 25.3% and ethane 1.7%.

The solution of potassium persulphate is fed as in Example 6.

The process described in Example 1 is followed until drying of the polymer.

The polymer nominal composition in percentage by weight is the following: FMVE 8.8%, TTD 0.7%, TFE 90.5%.

The data as indicated in Example 1 are reported in Tables 1, 2 and 4.

Example 8 (Comparative)

Obtaining of a Fluoropolymer having the Following Nominal Composition: FMVE 5.6% by Weight, TTD 0.4% by Weight; FMVE+TTD=6% by Weight In the same autoclave used in Example 1, after vacuum having been made, 13.9 liters of demineralized water, 2.92 g of TTD and 160 g of the above microemulsion (Example 1) are fed in sequence.

The autoclave is heated up to the reaction temperature of 75° C. and then 0.5 absolute bar ($5.10^4$ Pa) of ethane and 2.86 absolute bar ($2.86.10^5$ Pa) of FMVE are fed.

By a compressor a gaseous mixture having the following molar ratios among the components is fed: TFE/FMVE= 27.51, FMVE/TTD=17.5, TFE/TTD=481.5 up to a pressure of 21 absolute bar ($2.1.10^6$ Pa).

The composition of the gaseous mixture present in the autoclave head space is analyzed by gas-chromatography. Before the reaction starts, the gas phase results to be constituted by the following component molar percentages: TFE 81.5%, TTD 0.4%, FMVE 16.7% and ethane 1.4%.

The process described in Example 1 is followed until drying of the polymer.

The polymer nominal composition in percentage by weight is the following: FMVE 5.6%, TTD 0.4%, TFE 94%. Therefore the polymer contains a TTD amount lower than the limit in the case of composition B).

The data relating to the comparative Examples are reported in Table 1bis, corresponding to Table 1 of the Examples of the invention. Tables 3 and 5 correspond to Tables 2 and 4 of the Examples of the invention.

Example 9 (Comparative)

Obtaining of a Fluoropolymer having the Following Nominal Composition: FMVE 3.7% by Weight, TTD 1.8% by Weight; FMVE+TTD=5.5% by Weight In the same autoclave used in Example 1, after vacuum having been made, 13.9 liters of demineralized water, 9.2 g of TTD and 160 g of the above microemulsion are fed in sequence.

The autoclave is heated up to the reaction temperature of 75° C. and then 0.59 absolute bar ($5.9.10^4$ Pa) of ethane and 1.89 absolute bar ($1.89.10^5$ Pa) of FMVE are introduced.

By a compressor a gaseous mixture having the following molar ratios among the components is fed: TFE/FMVE= 42.09, FMVE/TTD=1.56, TFE/TTD=107.6 up to a pressure of 21 absolute bar ($2.1.10^6$ Pa).

The composition of the gaseous mixture present in the autoclave head space is analyzed by gas-chromatography. Before the reaction starts, the gas phase results to be constituted by the following component molar percentages: TFE 84.2%, TTD 0.9%, FMVE 12.5% and ethane 2.4%.

By a metering pump 95 ml of a solution of potassium persulphate 0.0103 M are fed and after 250 minutes further 45 ml of the same solution are introduced.

The process described in Example 1 is followed until drying of the polymer.

The polymer nominal composition in percentage by weight is the following: FMVE 3.7%, TTD 1.8%, TFE 94.5%. The polymer contains a FMVE amount lower than the limit in the case of composition B).

The data relating to the comparative Examples are reported in Table 1bis, corresponding to Table 1 of the Examples of the invention. Tables 3 and 5 correspond to Tables 2 and 4 of the Examples of the invention.

Example 10 (Comparative)

Obtaining of a Fluoropolymer having the Following Nominal Composition: FMVE 5.6% by Weight, TTD 6.0% by Weight; FMVE+TTD=11.6% by Weight In the same autoclave used in Example 1, after vacuum having been made, 13.9 liters of demineralized water, 36.14 g of TTD and 160 g of the above microemulsion are fed in sequence.

The autoclave is heated up to the reaction temperature of 75° C. and then 0.51 absolute bar ($5.1.10^4$ Pa) of ethane and 2.86 absolute bar ($2.86.10^5$ Pa) of FMVE are introduced.

By a compressor a gaseous mixture having the following molar ratios among the components is fed: TFE/FMVE= 26.71, FMVE/TTD=1.17, TFE/TTD=31.17 up to a pressure of 21 absolute bar ($2.1.10^6$ Pa).

The composition of the gaseous mixture present in the autoclave head space is analyzed by gas-chromatography.

Before the reaction starts, the gas phase results to be constituted by the following component molar percentages: TFE 76%, TTD 3.5%, FMVE 17% and ethane 1.5%.

The solution of potassium persulphate 0.0103 M is fed as described in Example 10.

The polymerization pressure is maintained constant by feeding the monomeric mixture with the above defined ratios and when 5,000 g of the mixture have been fed, the reaction is stopped. The reactor is cooled to room temperature and one proceeds as described in Example 1 until drying of the polymer.

The polymer nominal composition in percentage by weight is the following: FMVE 5.6%, TTD 6%, TFE 88.4%. The percentages by weight of the comonomers are comprised in the composition defined in B) but the sum of the comonomers FMVE +TTD is over the limit of 11 by weight.

The data relating to the comparative Examples are reported in Table 1bis, corresponding to Table 1 of the Examples of the invention. Tables 3 and 5 correspond to Tables 2 and 4 of the Examples of the invention.

Example 11 (Comparative)

A commercial fluoropolymer HYFLON® MFA 640 containing FMVE, FPVE (perfluoropropyl vinylether) and TFE has been used.

The data relating to the comparative Examples are reported in Table 1bis, corresponding to Table 1 of the Examples of the invention. Tables 3 and 5 correspond to Tables 2 and 4 of the Examples of the invention.

Comments to the Tables

From Tables 1 and 1 bis it is shown that the novel polymers show values of ionic end groups and of extractable F⁻ clearly lower than those of the reference commercial specimen (Example 11 comp.).

By comparing Tables 2 and 3 it is shown that the specimen of the comparative Example 10 (Table 3), characterized by the sum TTD+FMVE over the limits, shows an elongation at break lower than 250% and a stress at break lower than 2.5 MPa and therefore at the considered temperature it has no acceptable mechanical properties.

By comparing Tables 4 and 5 it is shown that the compounds relating to the comparative Examples 2, 8 and 9, prepared with polymers wherein:

the percentage by weight of FMVE in Examples 2 and 8 comp. is lower than the limits of the FMVE % in composition A);

the percentages by weight of FMVE and of TTD in Examples 2 and 8 comp. are lower than the limits of the TTD % of composition B);

the percentages by weight of FMVE and of TTD in Example 9 comp. are respectively lower and higher than the corresponding limits of composition A);

the percentage by weight of FMVE in Example 9 comp. is lower than the limits of the FMVE % in composition B);

show elongations at break (23° C.), measured along the welding lines, lower than 130%. The specimens obtained according to the present invention show elongations at break higher than both those of comparative Examples 2, 8 and 9 and that of the commercial specimen (comp. Example 11).

TABLE 1

| Ex. | Vinylether TTD composition (% by wt.) | | FMVE + TTD (% by wt.) | Composition | MFI g/10' | $T_{II}$ melting (° C.) | Ionic end groups (mol/Kg) | Release F after 24 h (ppm) |
|---|---|---|---|---|---|---|---|---|
| 1 | 5.6 | FMVE | | | 12.7 | 282.6 | $2.7 \times 10^{-4}$ | 1.0 |
|   | 1.8 | TTD | 7.4 | B) | | | | |
| 3 | 5.6 | FMVE | | | 11.2 | 283 | $3.0 \times 10^{-4}$ | 0.9 |
|   | 2 | TTD | 7.6 | B) | | | | |
| 4 | 5.6 | FMVE | | | 10.7 | 278.1 | $3.3 \times 10^{-4}$ | 1.0 |
|   | 3.0 | TTD | 8.6 | B) | | | | |
| 5 | 5.6 | FMVE | | | 15 | 275.6 | $3.0 \times 10^{-4}$ | 1.0 |
|   | 4.0 | TTD | 9.6 | B) | | | | |
| 6 | 6.4 | FMVE | | | 13.3 | 276.8 | $2.0 \times 10^{-4}$ | 1.0 |
|   | 1.7 | TTD | 8.1 | B) | | | | |
| 7 | 8,8 | FMVE | | | 14 | 268.4 | $3 \times 10^{-4}$ | 1.0 |
|   | 0.7 | TTD | 9.5 | A) | | | | | bis

| Ex. comp. | Vinylether TTD composition (% by wt.) | | FMVE + TTD (% by wt.) | MFI g/10' | $T_{II}$ melting (° C.) | Ionic end groups (mol/Kg) | Release F after 24 h. (ppm) |
|---|---|---|---|---|---|---|---|
| 2 comp. | 6.3 | FMVE | 7.0 | 12.8 | 283.8 | $2.4 \times 10^{-4}$ | 1.0 |
|   | 0.7 | TTD | | | | | |
| 8 comp. | 5.6 | FMVE | 6.0 | 13.3 | 287.4 | $2.5 \times 10^{-4}$ | 1.0 |
|   | 0.4 | TTD | | | | | |
| 9 comp. | 3.7 | FMVE | 5.4 | 13 | 292.8 | $2.0 \times 10^{-4}$ | 0.9 |
|   | 1.8 | TTD | | | | | |
| 10 comp. | 5.6 | FMVE | 11.6 | 20 | 266 | $4.0 \times 10^{-4}$ | 1.0 |
|   | 6.0 | TTD | | | | | |
| 11 comp. |  | FMVE FPVE | — | 13 | 286 | $1.0 \times 10^{-3}$ | 1.6 |

TABLE 2

| | | EXAMPLE | | | | | |
|---|---|---|---|---|---|---|---|
| | | 1 | 3 | 4 | 5 | 6 | 7 |
| Mechanical properties at 23° C. | | | | | | | |
| Elastic modulus | (MPa) | 472 | 364 | 423 | 461 | 456 | 419 |
| Yield stress | (MPa) | 14.7 | 14.6 | 15.2 | 15.6 | 14.3 | 14.3 |
| Stress at break | (MPa) | 27.6 | 21.4 | 30.1 | 30.4 | 29.7 | 29.5 |
| Elongation at break | (%) | 348 | 300 | 313 | 311 | 325 | 350 |
| Mechanical properties at 250° C. | | | | | | | |
| Elastic modulus | (MPa) | 12.0 | 7.0 | 5.3 | 6.0 | 7.0 | 4.8 |
| Yield stress | (MPa) | 2.4 | 2.0 | 2.0 | 1.8 | 2.0 | 1.4 |
| Stress at break | (MPa) | 3.5 | 3.2 | 3.5 | 2.7 | 3.4 | 2.5 |
| Elongation at break | (%) | 321 | 300 | 324 | 300 | 323 | 300 |

TABLE 3

| | | EXAMPLE (comparative) | | | | |
|---|---|---|---|---|---|---|
| | | 2 comp. | 8 comp. | 9 comp. | 10 comp. | 11 comp. |
| Mechanical properties at 23° C. | | | | | | |
| Elastic modulus | (MPa) | 440 | 465 | 430 | 510 | 500 |
| Yield stress | (MPa) | 14.1 | 14.1 | 14.9 | 16.3 | 14.4 |
| Stress at break | (MPa) | 25.4 | 25.0 | 25 | 33 | 26.3 |
| Elongation at break | (%) | 340 | 339 | 350 | 304 | 334 |
| Mechanical properties at 250° C. | | | | | | |
| Elastic modulus | (MPa) | 13.3 | 15.4 | 11 | 4.3 | 18.0 |
| Yield stress | (MPa) | 2.5 | 2.6 | 2.7 | 1.1 | 2.6 |
| Stress at break | (MPa) | 3.4 | 3.8 | 4.6 | 1.7 | 4.3 |
| Elongation at break | (%) | 300 | 318 | 393 | 195 | 435 |

TABLE 4

Plaques formed by the polymers of the present invention obtained by moulding injection: mechanical properties determined at 23° C. on the welding lines.

| | | EXAMPLE | | | | | |
|---|---|---|---|---|---|---|---|
| | | 1 | 3 | 4 | 5 | 6 | 7 |
| Mechanical properties at 23° C. on welding lines | | | | | | | |
| Elastic modulus | (MPa) | 446 | 504 | 521 | 533 | 456 | 436 |
| Yield stress | (MPa) | 13.4 | 13.8 | 14.5 | 14.4 | 13.4 | 12.4 |
| Stress at break | (MPa) | 13.9 | 14.9 | 17.4 | 17.0 | 15.1 | 16.5 |
| Elongation at break | (%) | 130 | 160 | 200 | 190 | 160 | 200 |

TABLE 5

Plaques formed by comparative polymers, obtained by injection moulding: mechanical properties determined at 23° C. on the welding lines.

| | | EXAMPLE (Comparative) | | | | |
|---|---|---|---|---|---|---|
| | | 2 | 8 | 9 | 10 | 11 |
| Mechanical properties at 23° C. on welding lines | | | | | | |
| Elastic modulus | (MPa) | 451 | 460 | 478 | 509 | 446 |

TABLE 5-continued

Plaques formed by comparative polymers, obtained by injection moulding: mechanical properties determined at 23° C. on the welding lines.

| | | EXAMPLE (Comparative) | | | | |
|---|---|---|---|---|---|---|
| | | 2 | 8 | 9 | 10 | 11 |
| Yield stress | (MPa) | 13.2 | 13.3 | 13.4 | 14.7 | 13.1 |
| Stress at break | (MPa) | 13.6 | 13.6 | 14 | 18.1 | 14.0 |
| Elongation at break | (%) | 115 | 70 | 90 | 166 | 125 |

What is claimed is:

1. Thermoprocessable copolymers of TFE consisiting essentially of the following monomers in the indicated amounts:

A)
  (a) 8.6–9.8% by weight of perfluoromethylvinylether (FMVE);
  (b) 0.3–1.2% by weight of a perfluorodioxole of formula:

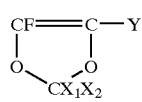

$$(I)$$

wherein:
  Y=F, $OR_f$, $R_f$ wherein $R_f$ is a perfluoroalkyl having from 1 to 5 carbon atoms;
  $X_1$ and $X_2$, equal to or different from each other, are —F or —$CF_3$;
  with the proviso that the sum of the percentages by weight of (a)+(b) is from 8.9 to 11% by weight; or B)
  (a) 4.5–8.5% by weight of perfluoromethylvinylether (FMVE);
  (b) 1.7–7.5% by weight of a perfluorodioxole as defined in A);
  with the proviso that the sum of the percentages by weight of (a)+(b) is from 6.2 to 11% by weight;
the complement to 100% by weight in compositions A) and B) being TFE;
said copolymers having:
  an amount of ionic end groups —COOH and —COF, not higher than $5 \times 10^{-4}$ moles/Kg polymer;

release values of F⁻ ions, determined on the polymer in pellet, not higher than 1 ppm by weight with respect to the polymer weight;

wherein the manufactured articles obtained from the polymers having compositions A) or B) show the following mechanical properties:

elongation at break≧130% measured at 23° C. along the welding lines of the injection moulded articles;

stress at break≧2.5 MPa and elongation at break≧250%, measured at 250° C. on compression moulded plaque.

2. Copolymers according to claim 1, wherein in formula (I) of comonomer (b) Y=OR$_f$, R$_f$=—CF$_3$; X$_1$=X$_2$=F.

3. Copolymers according to claim 1, wherein the Melt Flow Index measured at 372° C. with a load of 5 Kg is from 1 to 40 g/10' preferably from 6 to 30 g/10'.

4. Manufactured articles obtainable by injection moulding of the thermoprocessable copolymers according to claim 1, having the following mechanical properties:

elongation at break measured at 23° on the welding lines from 150% to 300%;

stress at break at 250° C. from 2.5 to 6 MPa;

elongation at break at 250° from 270 to 500%.

5. Manufactured articles according to claim 4 in the form of fittings.

6. Process for obtaining manufactured articles by injection molding of copolymers according to claim 1.

7. Process for obtaining manufactured articles by injection molding of copolymers according to claim 2.

8. Process for obtaining manufactured articles by injection molding of copolymers according to claim 3.

* * * * *